Dec. 30, 1969    R. C. RICHTER ET AL    3,486,585

MACHINE TOOL DAMPING UNIT

Filed Oct. 12, 1967    8 Sheets-Sheet 3

Dec. 30, 1969 R. C. RICHTER ET AL 3,486,585
MACHINE TOOL DAMPING UNIT
Filed Oct. 12, 1967 8 Sheets-Sheet 6

Dec. 30, 1969    R. C. RICHTER ET AL    3,486,585
MACHINE TOOL DAMPING UNIT

Filed Oct. 12, 1967    8 Sheets-Sheet 7

United States Patent Office 3,486,585
Patented Dec. 30, 1969

3,486,585
MACHINE TOOL DAMPING UNIT
Robert C. Richter, Sharonville, and John R. Hasz, Cincinnati, Ohio, assignors to The Cincinnati Milling Machine Co., Cincinnati, Ohio, a corporation of Ohio
Filed Oct. 12, 1967, Ser. No. 674,813
Int. Cl. F16d 63/00
U.S. Cl. 188—1
25 Claims

ABSTRACT OF THE DISCLOSURE

A machine tool damping unit for vibration control wherein a damping mass having at least one support control location is journalled by at least one viscoelastic absorber element, or element segments, either generally cone-shaped, ring-shaped with a tapered inner surface, or of essentially wedge-shaped strip configuration, so that movement between the absorber element and the support control location varies the working height, i.e., the amount of absorber material between a support control location and a retainer, so as to vary the stiffness of the absorber element, with said movement, as an option, being performed by automatic adjustment mechanisms of the position-responsive or frequency-responsive types.

---

This invention relates to machine tools, particularly to tuned vibration absorber units and their associated automatic adjustment mechanisms for damping machine tool vibrations.

These vibration absorbers or damping units may be utilized for instance in the movable overarms of milling machines, an example of one type being shown in Patent 2,412,499 assigned to the assignee of the present invention. A typical frequency response plot of a machine tool shows dynamic compliance on the vertical axis while showing frequency on the horizontal axis. Generally, the natural frequency of a machine structure without any damping units shows a very high resonant peak, but after a damper has been installed the response curve of the machine is highly attenuated and shows two peaks instead of one. These two peaks have a much higher dynamic stiffness than the machine without a damper and when the damper is properly tuned, these two peaks are of approximately equal magnitude. The low point in the valley between the two peaks is considered to be the natural frequency of the damper and when the damper is not properly tuned one of the peaks is suppressed too much, thus allowing the other peak to exhibit more dynamic compliance.

To date, adjustment of the natural frequency of the damper to a higher or lower frequency to obtain two peaks of approximately equal magnitude has been accomplished by subtracting or adding weight or changing the damper element material.

However, this approach is satisfactory only if the natural frequency of a machine tool is considered to be a constant and the damper is tuned to match this constant frequency.

Problems, however, ensue because on many machines the natural frequency changes drastically as a function of component position variation. For example, in milling machines, the set-up, overarm and table positions etc. greatly affect the natural frequency and when the natural frequency of the machine tool changes, the damper then becomes out of tune and its performance suffers. Thus, in order to maintain proper tuning, it is necessary to change the natural frequency of the damper when the machine tool's natural frequency changes.

Generally, damper systems are essentially fixed frequency designs and often consist of damper masses resting on viscoelastic absorber elements with the frequency of the damper mass being adjustable over a very limited frequency range by varying the pre-load on the absorber elements. However, the natural frequency variations obtainable by using this technique is only a few percent and insufficient for applications where the natural frequencies of machine tools change 50 percent or greater.

This invention solves the above problem by disclosing a design and structure to maximize the dynamic range of any damper installation by allowing the stiffness of the absorber elements to be readily adjusted over a wide range.

One species of this invention includes a centrally apertured viscoelastic absorber element generally conical in shape which is compressed and held in a tapered hole in a damper mass. A support shaft having a support control location or area is then radially held by the absorber element and a movement between the absorber element and the support control location varies the amount of material between the support shaft and the damper mass. For example, a movement in one direction automatically increases the stiffness in a radial sense by decreasing the radial working height of the viscoelastic absorber element between the support shaft and the tapered hole. As this radial working height gets smaller and smaller, the added stiffness of this differential absorber element increases greatly. It has been determined that this absorber element will approach a stiffness variation of almost 10:1 for the usable range of the viscoelastic absorber element length.

Another species of this invention discloses a viscoelastic absorber element of general ring-shape having a tapered inner surface which is compressed and held between a tapered mass end and a securing means, while the outside ring surface is interposed between the damper mass and a support control location. Again, movement between the viscoelastic absorber element and the support control location varies the radial working height of the absorber element thereby automatically varying the stiffness of the absorber element.

In addition, this invention includes a viscoelastic absorber element of essentially wedge-shaped strip configuration having its sloping side compressed and held in a wedge-shaped damping mass recess while one of its other sides is interposed between the damper mass and a support control location. Movement again varies the absorber element working height to vary the stiffness of the absorber element.

This invention also includes the use of single or multiple viscoelastic absorber elements as well as use of viscoelastic elements of different material compositions, for example, if multiple absorber elements are utilized they may be of different compositions, which may be used to influence or control different modes of vibration occurring in different modal axes.

In addition, this invention also includes the use of viscoelastic absorber elements having shapes other than uniformly variable cross-sectional shapes, e.g., the tapers need not be uniform but for example could be convex, concave or sinusoidal etc., and even if the tapers are uniform they could have various angles depending on the type of stiffness variations required.

A further advantage of this invention is that the viscoelastic absorber elements need not be composed of single continuous structures but may be composed of a multiplicity of segments without necessarily all segments being of the same material composition and/or shape.

This invention also discloses a viscoelastic machine tool damping unit wherein the utilization of multiple viscoelastic absorber elements allows for the adjustment or placement of at least one support control location in a position different in relation to the absorber element, i.e. the working height being different, from the positions of the remaining control locations in relation to their absorber elements. This adjustment may be used to influence or control one or more different modes of vibration occurring in different modal axes.

One embodiment of this invention also permits axial adjustment of the damper mass in relation to the support shaft without changing the final position of the support control locations in relation to the absorber elements. This shifting of the damper mass may also be used to influence or control different modes of vibration occurring in different modal axes.

A further advantage of this invention includes the solution of the problem of vibration control adjustment of the damping unit not only by manually effecting a movement between the absorber element and the control location but also by utilizing automatic adjustment mechanisms. These mechanisms include both the position-responsive and frequency-responsive types, which can automatically vary the support control location, thus varying the stiffness of the absorber elements.

In summary, this invention provides a machine tool damping unit for vibration control having at least one mode of vibration for use on a machine tool having at least one component subject to vibration and composed of at least one damper mass; at least one damper mass support means for supporting the damper mass and having at least one support control location; at least one viscoelastic absorber element of variable cross-section having a predetermined range of working heights and journalling the damper mass; at least one absorber element retaining means; and a vibration control adjustment means to effect a movement between the absorber element and the support control location to vary the working height of the absorber element so as to vary the stiffness of the absorber element. In addition, automatic adjustment mechanisms e.g., position-responsive and frequency-responsive types, may be utilized for automatic self-adjustment purposes.

Other features and advantages of the present invention should be readily apparent by reference to the following specification, considered in conjunction with the accompanying drawings forming a part thereof, and it is to be understood that any modifications may be made in the exact structural details thereshown and described, within the scope of the appended claims, without departing from or exceeding the spirit of the invention.

FIGURE 19a is a section of an automatic adjustment mechanism for a machine tool mounted damping unit.

FIGURE 19b is a fragmentary side view in elevation of the automatic adjustment mechanism of FIGURE 19a.

FIGURE 19c is a fragmentary front view of the automatic adjustment mechanism of FIGURE 19a.

FIGURE 20 is a block diagram of another automatic adjustment mechanism for a machine tool mounted damping unit.

Figure 1:
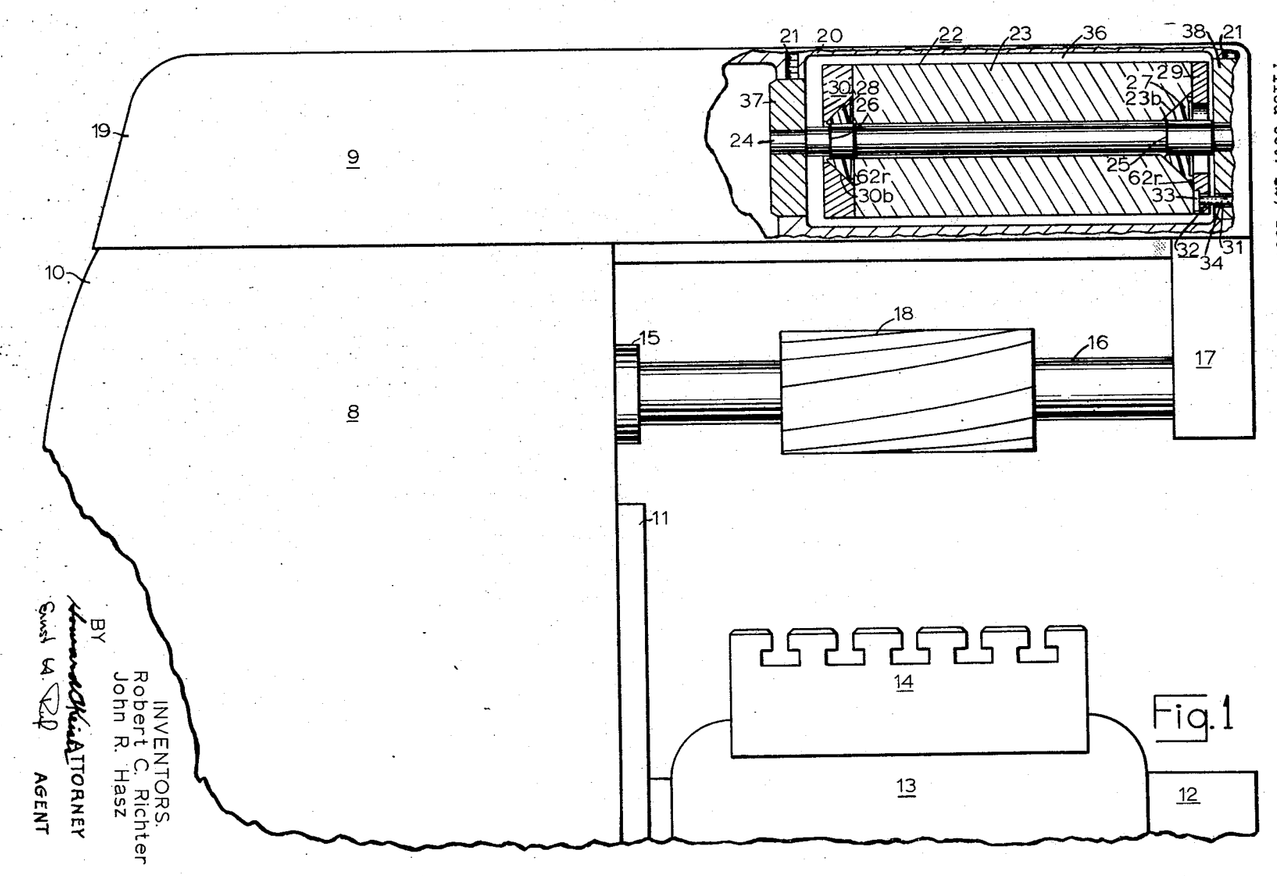
FIGURE 1 is a fragmentary elevation and sectional view of a machine tool embodying this invention.
Figure 6:
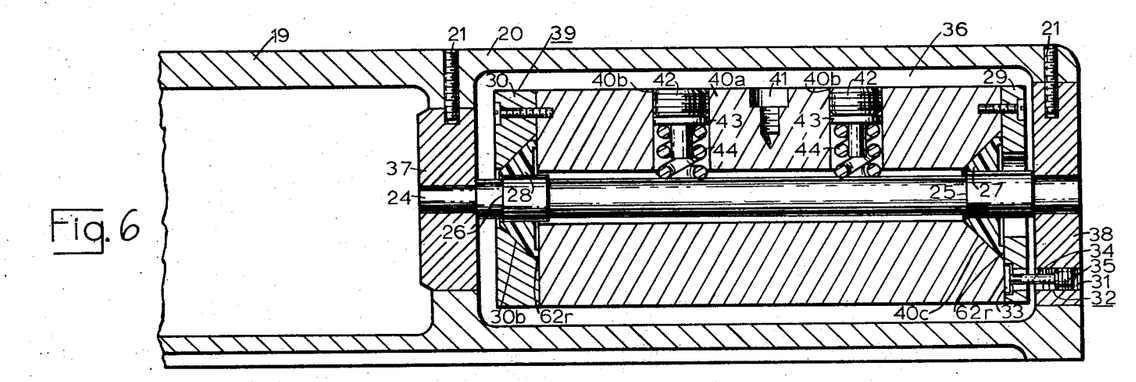
FIGURE 6 is a modified enlarged section of the damping mechanism shown in FIGURE 1.

Referring now to the drawings in detail, FIGURE 1 is a fragmentary elevation and sectional view of a general purpose milling machine 8 having overarm 9 slidable on column 10. Column face 11 supports knee 12, saddle 13 and table 14, all relatively movable in relation to each other. Arbor 16, having cutter 18 mounted thereupon, is journalled on the one end of arbor support 17 extending from overarm 9 and on the other end by spindle 15 extending from column 10. Overarm 9, composed of overarm housing 19 having internal webs 20, has secured in two webs 20 by screws 21, apertured rear plate 37 and apertured front plate 38. Located in overarm front cavity 36 and journalled between rear and front plates 37, 38 is damping unit 22. Damping unit 22 is composed of stepped support shaft 24, having front and rear support control locations 25, 26 on the raised step portions, with shaft 24 being supported between rear and front plates 37, 38; centrally apertured damper mass 23 having tapered recess 23b, enveloping shaft 24; front and rear viscoelastic absorber elements 27, 28 journalling damper mass 23 with viscoelastic absorber elements 27, 28 being interposed between the ends of damper mass 23 and apertured front and rear securing means 29, 30, the latter having tapered recess 30b. As best seen in FIGURE 6, an adjusting screw 32, having head 33 held between damper mass 23 and front securing means 29, has body portion 34 attached to threaded leg portion 35 located in threaded bore 31 of front plate 38. The circular end face of leg portion 35 is properly slotted or recessed to allow insertion of a screw-turning tool. Operation of damping unit 22 in milling machine 8, for example, depending on the set-up and position of overarm 9, is as follows: Overarm 9 in operation will vibrate at a particular natural frequency, which frequency is by design (based on tests), within the dynamic range of damping unit 22. Turning adjusting screw 32 in bore 31 will cause movement of damper mass 23 and viscoelastic absorber elements 27, 28 in relation to front and rear support control locations 25, 26 on shaft 24 thereby either increasing or decreasing, depending on the direction of turning, the amount of viscoelastic absorber element material between support control locations 25, 26 and the viscoelastic absorber element housings between damper mass 23 and front and rear securing means 29, 30. For example, movement of damper mass 23 to the right will automatically decrease the working radial height of viscoelastic absorber elements 27, 28 and increase their stiffness, thus increasing the natural frequency of the damper unit. As soon as, because of adjustment, by screw 32, damping unit 22 approaches the vibration frequency of that of overarm 9, damping unit 22, suspended on viscoelastic absorber elements 27, 28, will absorb those vibrations and allow smooth operation of machine 8.

Figure 4A:
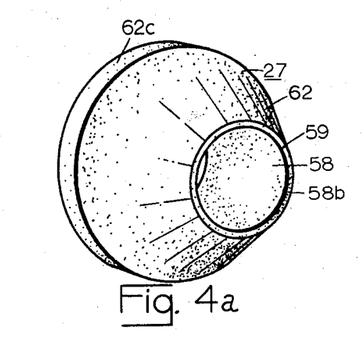
FIGURES 4a, 4b and 4c show several views of one of the viscoelastic absorber elements of this invention.
Figure 4B:
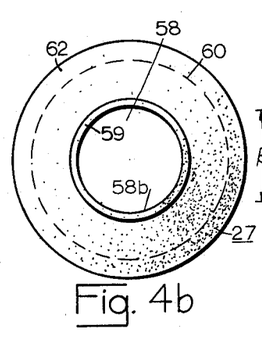
Figure 4C:
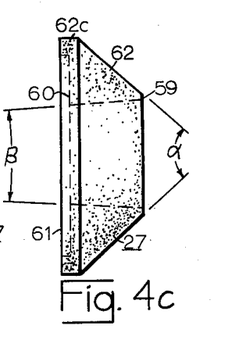
Figure 5A:
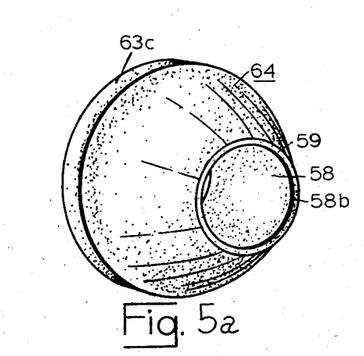
FIGURES 5a, 5b and 5c show several views of a modified form of a viscoelastic absorber element.
Figure 5B:
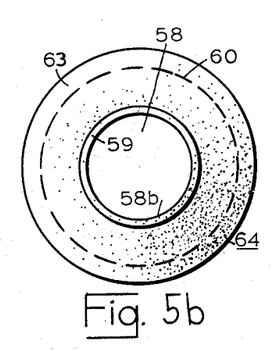
Figure 5C:
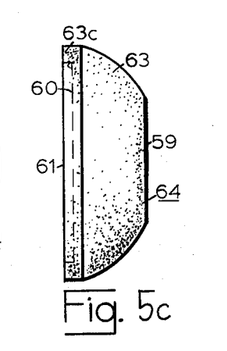

Viscoelastic absorber elements 27, 28 are generally of comparable size, shape and material although these properties may be changed if needed to influence or control different modes of vibration occurring in different modal axes. FIGURES 4a, 4b and 4c show several views of free-state, generally truncated, cone-shaped viscoelastic absorber element 27 having ring-shaped small end surface 59; ring-shaped large end surface 61, having recessed ring position 60 for limited surface contact; generally sloping side surface 62 changing into cylindrical surface 62c perpendicular to ring surface 61; and a central axial hole 58 therethrough having inside surface 58b substantially perpendicular to end surfaces 59, 60. Viscoelastic absorber element 27, in its free state, has an included angle $\alpha$ between sides 62 of 84° and central axial hole 58 has an included angle $\beta$ of 7°. FIGURES 5a, 5b and 5c show several views of a modified form of a truncated generally cone-shaped viscoelastic absorber element 64 of generally similar form and shape to that of FIGURES 4a, 4b and 4c, with the exception of non-uniformly sloping surface 63 which may, for example, be convex as shown in FIG. 5c, concave or sinusoidal etc. Surface 63 also changes into cylindrical surface 63c perpendicular to ring surface 61.

Figure 2:
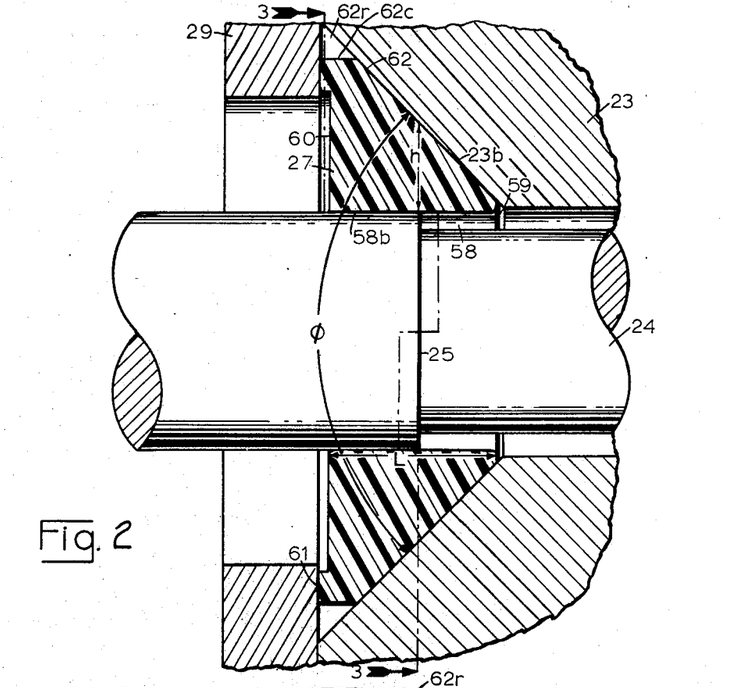
FIGURE 2 is a section of an installation of a viscoelastic absorber element embodied in this invention.
Figure 3:
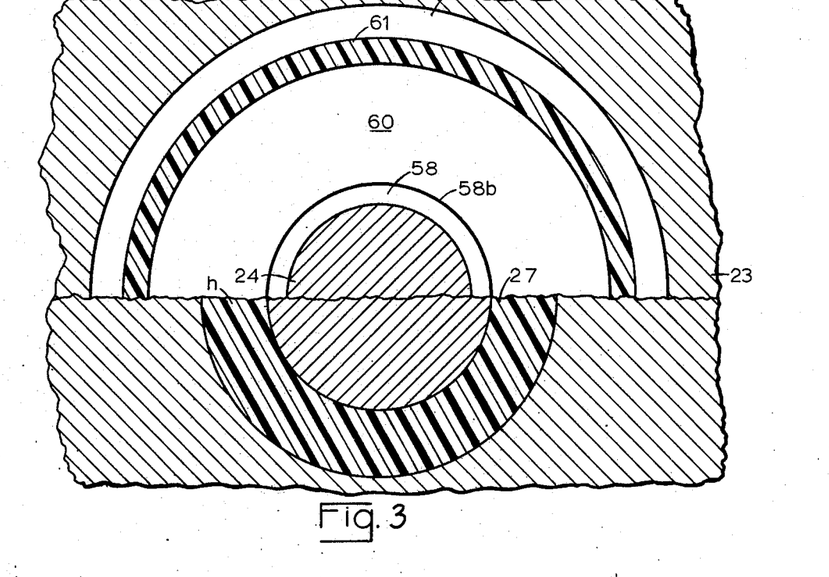
FIGURE 3 is a sectional view taken generally along the line 3—3 through the installation shown in FIGURE 2.

FIGURES 2 and 3 show sections of the installation of viscoelastic absorber element 27 wherein relative movement between stepped support shaft 24 and damper mass 23 varies height $h$ of element 27 between support control location 25 and sloping surface 62 of element 27 thereby varying the stiffness of element 27. Note that recess 62r allows for expansion of elements 27, 28 and prevents high stress concentrations on ring surface 61. In the alternative, if a recess is provided in either damper mass 23 or rear securing means 29, then sloping surface 62 and ring surface 61 of element 27 could be extended until they intersect, thereby eliminating cylindrical surface 62c. In addition, recessed ring portion 60 may be eliminated if a proper recess is provided in the abutting wall portion of rear securing means 29. Length L is the usable range of absorber element 27, which in this application approaches a stiffness variation of almost 10:1.

In the installation shown in FIGS. 2 and 3, the included angle $\phi$ between sides 62 of installed cone-shaped element 27 is 90°; recess 23b in damper mass 23 has an included angle of 90°; and central axial hole 58 has no taper. Forcing the 84° free-state cone into the 90° recess provides for equal pressure distribution on sloping surface 62, eliminates the 7° included angle in hole 58 and eliminates stress concentrations on ring surface 61. Obviously, cone angle $\alpha$ of free state element 27, cone angle $\phi$ of installed element 27 as well as the included angle of recess 23b in damper mass 23 could be somewhat greater or lesser than those values noted herein; however, the design using the stated values is preferred, from a manufacturing standpoint. An interference fit of approximately .010–.020 inch between hole 58 and the raised step portion of shaft 24 assures proper retention of shaft 24.

FIG. 6 is a modified, enlarged section of damping unit 22 shown in FIG. 1. Damping unit 39 of FIG. 6 differs from damping unit 22 only in its incorporation of a lifting hook recess 41 and use of modified centrally apertured damper mass 40a which in addition to tapered front recess 40c, has two holes 40b into each of which are inserted balance springs 44, stepped centering spacer 43 and closure plug 42. Springs 44 which on one end abut support shaft 24 are held in compression so as to approximately balance the weight of damper mass 40a, thereby eliminating nearly all static shear loads on viscoelastic absorber elements 27, 28. Turning adjusting screw 32, as in damping unit 22, moves damper mass 40a in relation to stepped support shaft 24 thereby changing height $h$ of viscoelastic absorber elements 27, 28. It has been determined that the usable range of absorber elements 27, 28 will produce a stiffness variation of about 10:1.

Figure 7:
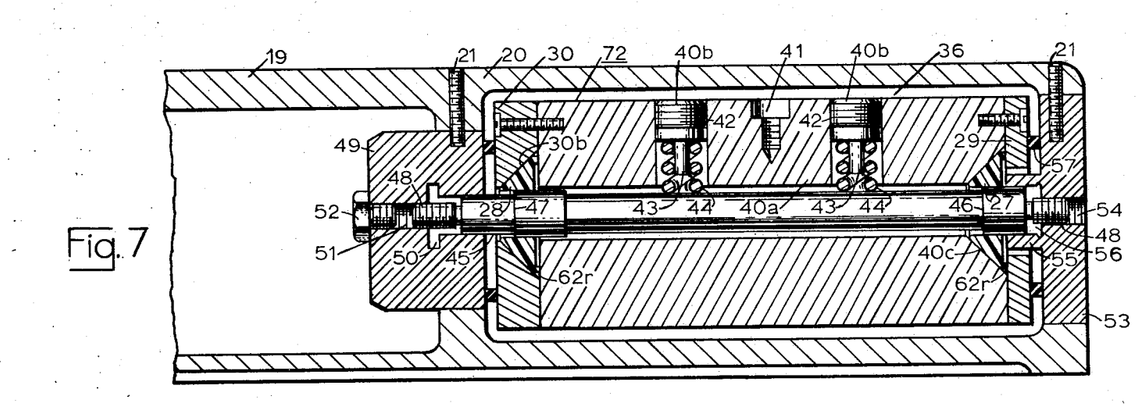
FIGURE 7 is a modified section of the damping mechanism shown in FIGURE 6.

FIG. 7 is a modified section of damping unit 39 shown in FIG. 6 and damping unit 72 of FIG. 7 differs therefrom only in its incorporation of two viscoelastic retaining rings 57 and use of modified stepped support shaft 45 as well as modified front plate 53 and rear plate 49. Front plate 53 has a threaded central bore 54 and extending from its rear face is a raised central ring-shaped portion 55 defining cavity 56. Centrally apertured rear plate 49 has a smooth bore portion 50 and a threaded bore portion 51, the latter containing end bolt 52. Stepped support shaft 45 has front and rear support control locations 46, 47 and extending from the shaft ends are threaded portions 48. The diameters of support control locations 46, 47 and the diameters of cavity 56 and bore portion 50 are substantially similar, with control locations 46, 47 being movably supported in the latter. Threaded portions 48 are located in threaded bores 51 and 54. The circular end faces of threaded portions 48 are suitably slotted or recessed to allow insertion of a turning tool. Turning of shaft 45 will axially move support control locations 46, 47 in relation to damper mass 40a and absorber elements 27, 28, thereby either increasing or decreasing, depending on the direction of turning, the amount of viscoelastic element material between damper mass 40a and front and rear securing means 29, 30. Damper mass 40a is elastically held between front and rear plates 53, 49 by two viscoelastic retaining rings 57. Threaded portions 48, on both ends of support shaft 45, as well as threaded bores 51 and 54 of end plates 49 and 53 respectively, are required to pre-load viscoelastic retaining rings 57 and to make damping unit 39 self-contained. In addition, threaded portions 48, and threaded bores 51, 54 must have the same thread pitch so that the preload on rings 57 is not lost when support shaft 45 is moved. End bolt 52 and cavity 56 serve to limit the amount of axial movement of support shaft 45.

Figure 8:
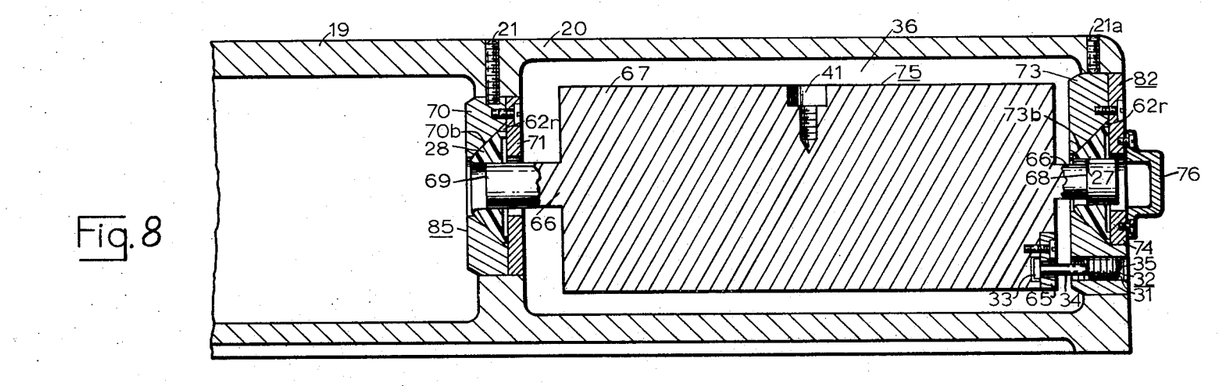
FIGURE 8 is a further modified enlarged section of the damping mechanism shown in FIGURE 1.

Damping unit 75 of FIG. 8 is composed of damper mass 67 having lifting hook recess 41 and integral, axially extending, support ends 66 having front and rear support control locations 68, 69; front and rear viscoelastic absorber elements 27, 28 journalling damper mass 67: rear retaining means 85 having apertured rear plate 70 with tapered recess 70b joined with apertured rear plate retainer 71 and having rear viscoelastic absorber element 28 interposed therebetween; front retaining means 82 having apertured front plate 73 with tapered recess 73b joined with apertured front plate retainer 74 and having front viscoelastic absorber element 27 interposed therebetween. Recesses 62r allow for expansion of elements 27 and 28. Adjusting screw 32 is attached to damper mass 67 by securing plate 65 and the turning of screw 32 moves damper mass 67 and support control location 68, 69 in relation to absorber elements 27, 28 retained in front and rear support means 82, 85 respectively, thus varying the stiffness of absorber elements 27, 28. Damping unit 75 also permits axial adjustment of rear support control location 69 in the relation to rear support element 28 without disturbing the relationship between front support control location 68 and front absorber element 27 by loosening set screw 21a in web 20 and by means of handle 76, attached to front retaining means 82, axially moving front retaining means 82 either to the right or left, which will also cause movement of damper mass 67 because of the rigid connection therebetween provided by adjusting screw 32 which at the same time arrests axial movement between front support control location 68 and front absorber element 27. This adjustment may be used to influence or control different modes of vibration occurring in different modal axes.

Figure 9:
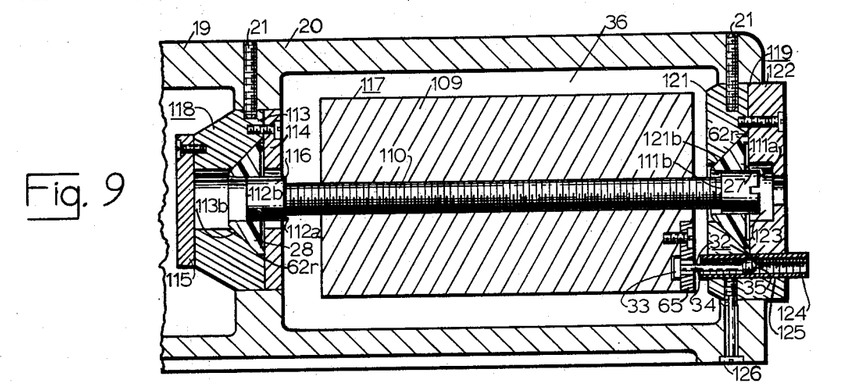
FIGURE 9 shows an additional modified enlarged section of the damping mechanism shown in FIGURE 1.

Damping unit 117 in FIG. 9, which is an additional modified enlarged section of the damping mechanism shown in FIG. 1, is composed of damper mass 109 having a threaded central bore; front and rear viscoelastic absorber elements 27, 28 journalling damper mass 109; partially threaded support shaft 110 extending through damper mass 109 and having front support control locations 111a, 111b and rear support sleeve 116, incorporating rear support control locations 112a, 112b, rigidly attached to stepped support shaft 110; rear retaining means 118 having apertured rear plate 113 with tapered recess 113b closed on one end by rear closure plate 115 and joined on the other end with apertured rear plate retainer 114, with rear absorber element 28 being interposed therebetween; front retaining means 119 having apertured front plate 121 with tapered recess 121b joined with apertured front plate retainer 122 and having front absorber element 27 interposed therebetween. Recesses 62r allow for expansion of elements 27 and 28. Adjusting screw 32 has head 33 attached to damper mass 109 by securing plate 65 and threaded leg portion 35 is located in slidable internally threaded sleeve 124 secured in bore 125 of front retaining means 119 by set screw 126. Turning adjusting screw 32 moves damper mass 109 and support control locations 111a, 111b, 112a, 112b in relation to absorber elements 27, 28 retained in retainer means 119, 118 respectively, thus varying the stiffness of elastic absorber elements 27, 28. Depending on the location of damper mass 109 in relation to support shaft 110 either support control location 111a and 112a or 111b and 112b are utilized. The distance separating the first and second control locations 111a, 112a, and 111b, 112b resepectively, is equal to the usable range of elastic absorber elements 27, 28 which are substantially similar. Damping unit 117 also permits axial adjustment of damper mass 109 in relation to support shaft 110 without changing the final position of control locations 111a, 111b, 112a and 112b in relation to absorber elements 27, 28 respectively, as follows: The circular end face of control location 111a is slotted and support shaft 110 may be moved in either direction by using a turning tool inserted through stepped bore 123 in front plate retainer 122 thereby equally changing the initial relationship between control location 111a, 111b, 112a, 112b and absorber elements 27, 28 while holding damper mass 109 stationary. After moving support shaft 110 the desired amount, adjusting screw 32 is moved to return control locations 111a, 111b, 112a, 112b to their initial position, the net effect being that only the relationship between damper mass 109 and support shaft 110 has been changed, which change may be used to influence or control different modes of vibration occurring in different model axes. Internally threaded sleeve 124 may be slidably moved or turned in bore 125 upon release of set screw 126 to effect adjustment between sleeve 124 and adjusting screw 32 to allow the latter to have adequate range.

Figure 10:
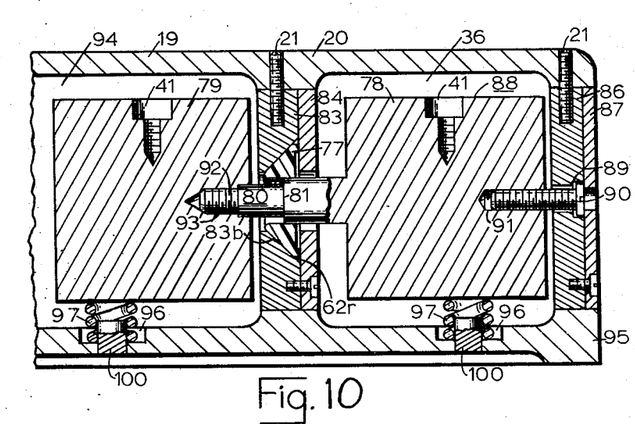
FIGURE 10 is a sectional view of a damping mechanism utilizing multiple damping masses.

FIGURE 10 is a sectional view of a damping mechanism utilizing multiple damper masses. Damping unit 88 in cavities 36 and 94 is composed of rigidly joined damper masses 78, 79, the former having integral support shaft 80 with intermediate support control location 81, joined by means of threaded portion 92 retained in threaded bore 93 of damper mass 79; intermediate viscoelastic absorber element 77, of like design as previously described element 27, 28, journalling damper masses 78, 79; apertured intermediate retaining plate 83 with tapered recess 83b joined with apertured intermediate plate retainer 84 and having absorber element 77 interposed therebetween; and apertured front plate 86 joined with apertured front plate retainer 87. Recess 62r allows for expansion of element 77. Adjusting screw 90 is loosely retained in stepped bore 89 of front plate 86 and confined by apertured front plate retainer 87 while being threaded at one end in threaded bore 91 of damper mass 78. Turning of adjusting screw 90 moves damper masses 78, 79 and support control location 81 in relation to viscoelastic absorber element 77 thus varying the stiffness of element 77. Springs 97 confined in recesses 96 of overarm base portion 95 and centered by pins 100 approximately balance the weight of damper masses 78, 79, thereby eliminating nearly all static shear loads on absorber element 77 and reducing longitudinal rocking of damper masses 78, 79.

Figure 11:
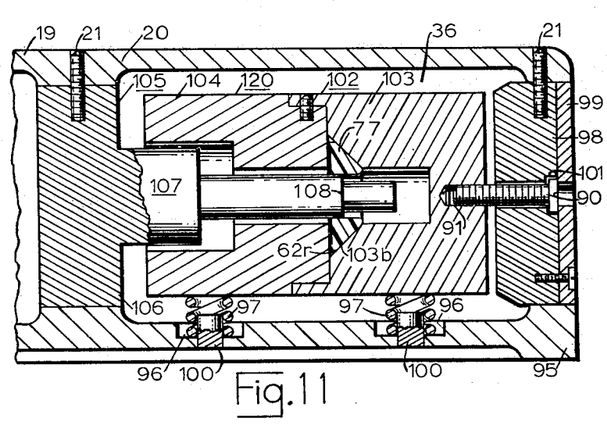
FIGURE 11 is a sectional view of a damping mechanism utilizing a single viscoelastic absorber element.

FIG. 11 is a sectional view of a damping mechanism utilizing a single viscoelastic absorber element. Damping unit 120 in cavity 36 is composed of damper mass 102 having front damper mass 103 with tapered recess 103b joined with rear damper mass 104; viscoelastic absorber element 77 interposed and journalling front and rear masses 103, 104 respectively; support structure 105 having integral stepped support shaft 107 with intermediate support control location 108; and apertured front plate 98 joined with apertured front plate retainer 99. Recess 62r allows for expansion of element 77. Turning of adjusting screw 90 as in FIG. 10 moves damper mass 102 and support control location 108 in relation to viscoelastic absorber element 77 thus varying the stiffness of element 77. Springs 97 confined in recesses 96 of overarm base portion 95 and centered by pins 100 approximately balance the weight of damper mass 102, thereby eliminating nearly all static shear loads on absorber element 77 and reducing longitudinal rocking of damper mass 102.

Figure 12:
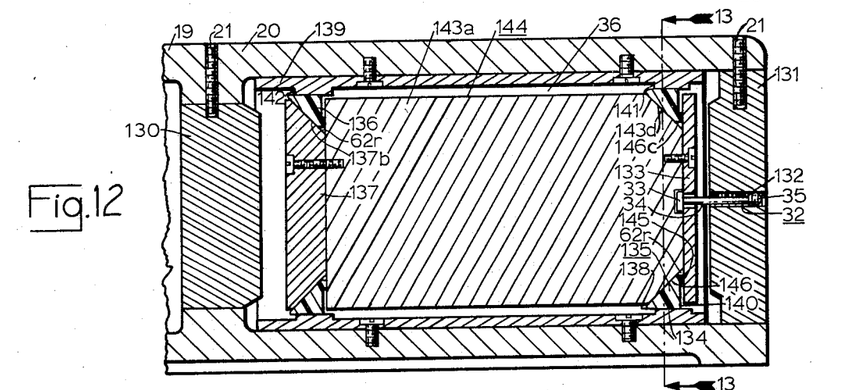
FIGURE 12 is a section of a damping mechanism showing the installation of another species of viscoelastic absorber element.

FIG. 12 is a section of a damping mechanism showing the installation of another species of viscoelastic absorber element. Damping unit 144 is composed of damper mass 143a having tapered surface portion 143d; stepped support sleeve 139 surrounding damper mass 143a and attached to cavity 36 and having front and rear support control locations 141, 142 respectively; front and rear securing means 133, 137 attached to the ends of damper mass 143a with rear securing means 137 having tapered surface portion 137b; front and rear viscoelastic absorber elements 135, 136 interposed between damper mass 143a and front and rear securing means 133, 137 respectively, with elements 135, 136 journalling damper mass 143a; rear plate 130 and apertured front plate 131 having threaded bore 132. Recesses 62r allow for expansion of elements 135, 136. Adjusting screw 32, having its head 33 retained between front securing means 133 and damper mass 143a, has threaded leg portion 35 engaged in threaded bore 132 of front plate 131 so that a turning of screw 32 will axially move damper mass 143a and absorber elements 135, 136 in relation to support control locations 141, 142 thereby either increasing or decreasing the amount of viscoelastic material between support sleeve 139 (i.e. support control locations 141, 142) and damper mass 143a.

Figure 13A:
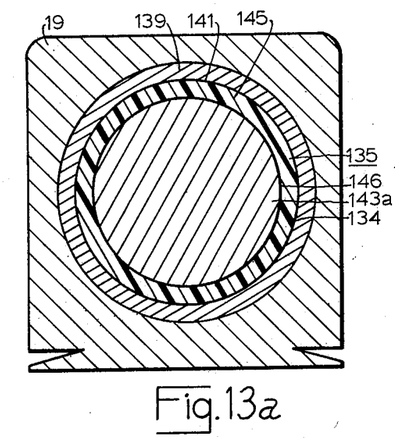
FIGURE 13a is a section taken along line 13—13 of FIGURE 12.

Viscoelastic absorber elements 135, 136 are generally of comparable size, shape and material although these properties may be changed, if needed, to influence or control different modes of vibration occurring in different modal axes. FIG. 12 and FIG. 13a, which is a section taken along line 13—13 of FIG. 12, show element 135 to be generally ring-shaped and composed of ring-shaped small end surface 138; concentric ring-shaped large end surface 145 having recessed ring portion 140 for limited surface contact; outer surface 134 substantially perpendicular to end surfaces 138, 145; and sloping inner surface 146 changing into cylindrical surface 146c perpendicular to ring surface 145.

Figures 13B, 13C, 13D:
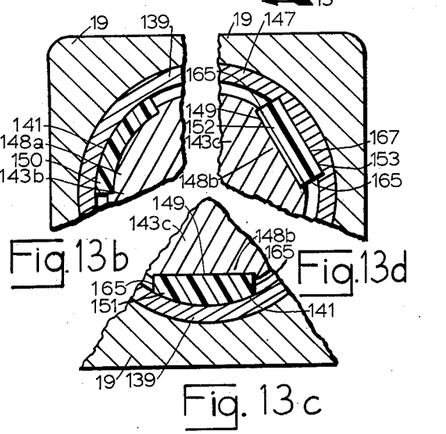
FIGURE 13b is a modified partial section taken along line 13—13 of FIGURE 12 and shows the use of a viscoelastic absorber element segment.
FIGURE 13c shows a modified form of the viscoelastic absorber element segment of FIGURE 13b.
FIGURE 13d shows a modified form of the viscoelastic absorber element segment of FIGURE 13c.

FIGS. 13b, 13c and 13d are all modified partial sections taken along line 13—13 of FIG. 12 and show the use of modified viscoelastic absorber element segments. FIG. 13b shows the use of viscoelastic absorber element 150 which is but a segment of previously described absorber element 135, with segment 150 being retained in recess 148a of modified damper mass 143b. FIG. 13c shows the use of modified viscoelastic absorber element segment 151 similar to element segment 150, but having flat inner sloping surface 149 retained in recess 148b of modified damper mass 143c and having edges 165 perpendicular to surface 149. FIG. 13d shows the use of modified viscoelastic absorber element 152 similar to element segment 151 but having flat outer surface 167. Element 152 is retained between recess 148b of modified damper mass 143c and support control location 153 of modified support sleeve 147. Element 152 may alternately also be of the general shape of absorber element 162 shown in FIGS. 16a, 16b and which will be fully described as this description progresses. Of course, it is understood that multiples of segments 150, 151 or 152 may be utilized without necessarily all segments being of the same material composition and/or shape. The theory and mode of operation is the same as in previously described species. Absorber element recess and/or angle modifications of the type described in relation to the previous species are also applicable here.

Figure 14:
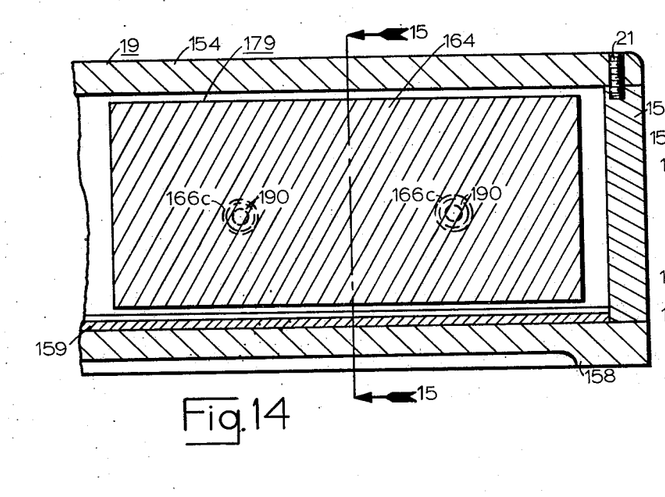
FIGURE 14 is a section of a damping mechanism showing the installation of a further species of viscoelastic absorber elements.
Figure 15:
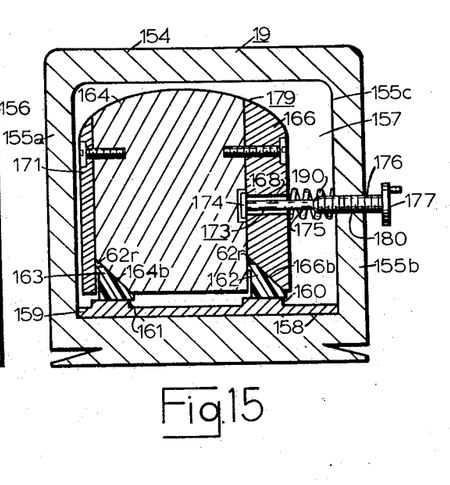
FIGURE 15 is a section taken along line 15—15 of FIGURE 14.

FIG. 14 and FIG. 15, which is a section taken along line 15—15 of FIG. 14, are sections of a damping unit showing the installation of a further species of viscoelastic absorber elements. Damping unit 179 is composed of damper mass 164 with tapered surface 164b contained in cavity 157 of overarm housing 19 having top portion 154, sides 155a, 155b and base portion 158; stepped support control plate 159 attached to base portion 158 and having first and second support control locations 160, 161; first and second securing plates 166, 171 attached to damper mass 164, with plate 166 having tapered surface 166b and bores 166c; first and second viscoelastic absorber elements 162, 163 journalling damper mass 164 and interposed between damper mass 164 and first and second securing plates 166, 171 respectively. Recesses 62r allow for expansion of elements 162, 163. Adjusting mechanism 173 has head 174 secured between damper mass 164 and first securing plate 166 while body portion 175 extends through bore 168 in first securing plate 166 and threaded portion 176, having crank or dial 177 affixed to one end, is retained in threaded bore 180 of side wall 155. Turning of crank or dial 177 in either direction transversely moves damper mass 164 and absorber elements 162, 163 in relation to support control locations 160, 161 thereby either increasing or decreasing the amount of supported viscoelastic absorber material between support control plate 159 and damper mass 164. Compression springs 190, confined between securing plate 166 and wall 155b, have one end retained in bores 166c and the other end abutting inside wall portion 155c of wall 155b. Springs 190 assure proper alignment of viscoelastic absorber elements 162, 163 and support control locations 160, 161 respectively.

Figure 16A:
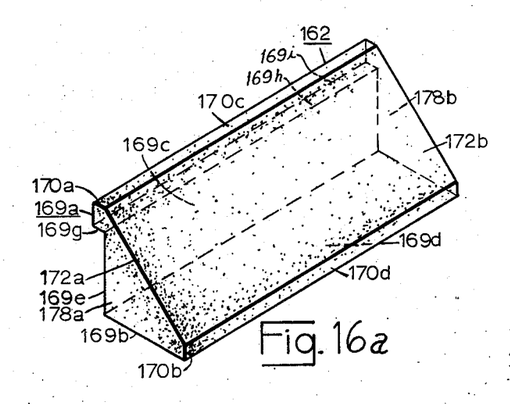
FIGURES 16a and 16b show several views of the viscoelastic absorber element utilized, for example, in FIGURES 14 and 15.
Figure 16B:
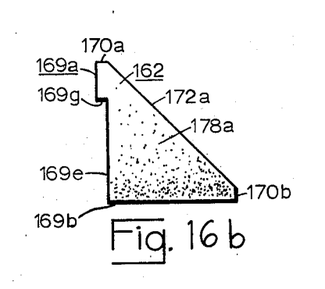

Viscoelastic absorber elements 162 and 163 are of comparative size, shape and material although these properties may be changed, if necessary, to influence or control different modes of vibration occurring in different modal axes. FIGS. 16a and 16b show several views of viscoelastic absorber element 162 comprising a generally elongated body, substantially wedge-shaped in cross-section, having two substantially identical parallel end surfaces 178a, 178b, composed of perpendicularly intersecting large sides 169a, 169b; with the former having recessed portion 169e, joined by connecting portion 169g; small sides 170a, 170b, perpendicularly intersecting the ends of large sides 169a, 169b, remote from the intersection of sides 169a, 169b; and sloping side 172a connecting the ends of small sides 170a, 170b, remote from their intersections with sides 169a, 169b, respectively; with a plurality of perpendicular parallelograms 169c, 169d, 169h, 169i, 170c, 170d, and 172b joining end surfaces 178a, 178b. Confining absorber element 162 on side parallelogram 169h and on sloping side parallelogram 172b between damper mass 164 and first securing plate 166 causes large side parallelogram 169d to bear against support control location 160. Of course, suitable binding means may be provided between side parallelogram 172b and tapered surface 164b of damper mass 164. Shifting of damper mass 164, and consequently absorber element 162, varies the amount of supporting viscoelastic absorber material between stepped support control plate 159 and damper mass 164 thereby varying the stiffness of absorber element 162. As soon as damping unit 179, because of adjustment by adjusting mechanism 173, approaches the vibration frequency of overarm 9, damping unit 179 because of its suspension on viscoelastic absorber elements 162, 163, absorbs the vibrations and allows smooth operation. Absorber element recess modifications and/or angle variations of the types previously described are also applicable here.

Figure 17:
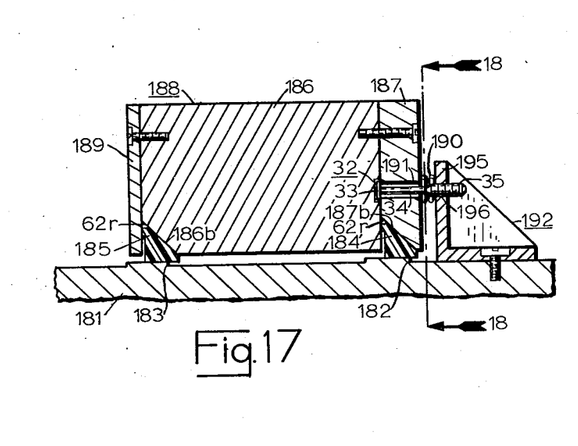
FIGURE 17 is a section of yet another damping mechanism which is installable on any machine tool component.
Figure 18:
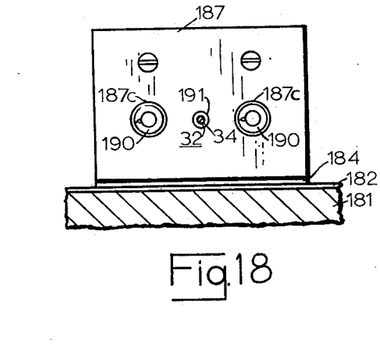
FIGURE 18 is a section taken along line 18—18 of FIGURE 17.

FIG. 17 and FIG. 18, which is a section taken along line 18—18 of FIGURE 17, are sections of yet another damping mechanism installable on any machine tool component. Damping unit 188 is composed of damper mass 186 having tapered surface 186b; machine tool component 181 having front and rear support control locations 182, 183; front and rear securing plates 187, 189 attached to damper mass 186, with plate 187 having tapered surface 187b and bores 187c; front and rear viscoelastic absorber elements 184, 185 journalling damper mass 186 and interposed between damper mass 186 and front and rear securing plates 187, 189 respectively. Adjusting screw 32, previously described, has head 33 secured between damper mass 186 and front securing plate 187, while threaded leg portion 35 is retained in threaded bore 196 of portion 195 of adjusting screw bracket 192 fastened to machine tool component 181. Turning of screw 32 again increases or decreases the amount of supported viscoelastic absorber material between machine tool component 181 and damper mass 186 in the same manner and having the same results as previously described. Compression springs 190, having one end retained in bores 187c and the other end abutting portion 195 of adjusting screw bracket 192, again assure proper alignment of viscoelastic absorber elements 184, 185 and support control locations 182, 183 respectively. Viscoelastic absorber elements 184 and 185 are of comparable size, shape and material to those of viscoelastic absorber elements 162 and 163 previously described.

Figures 19A, 19B, 19C, 20:
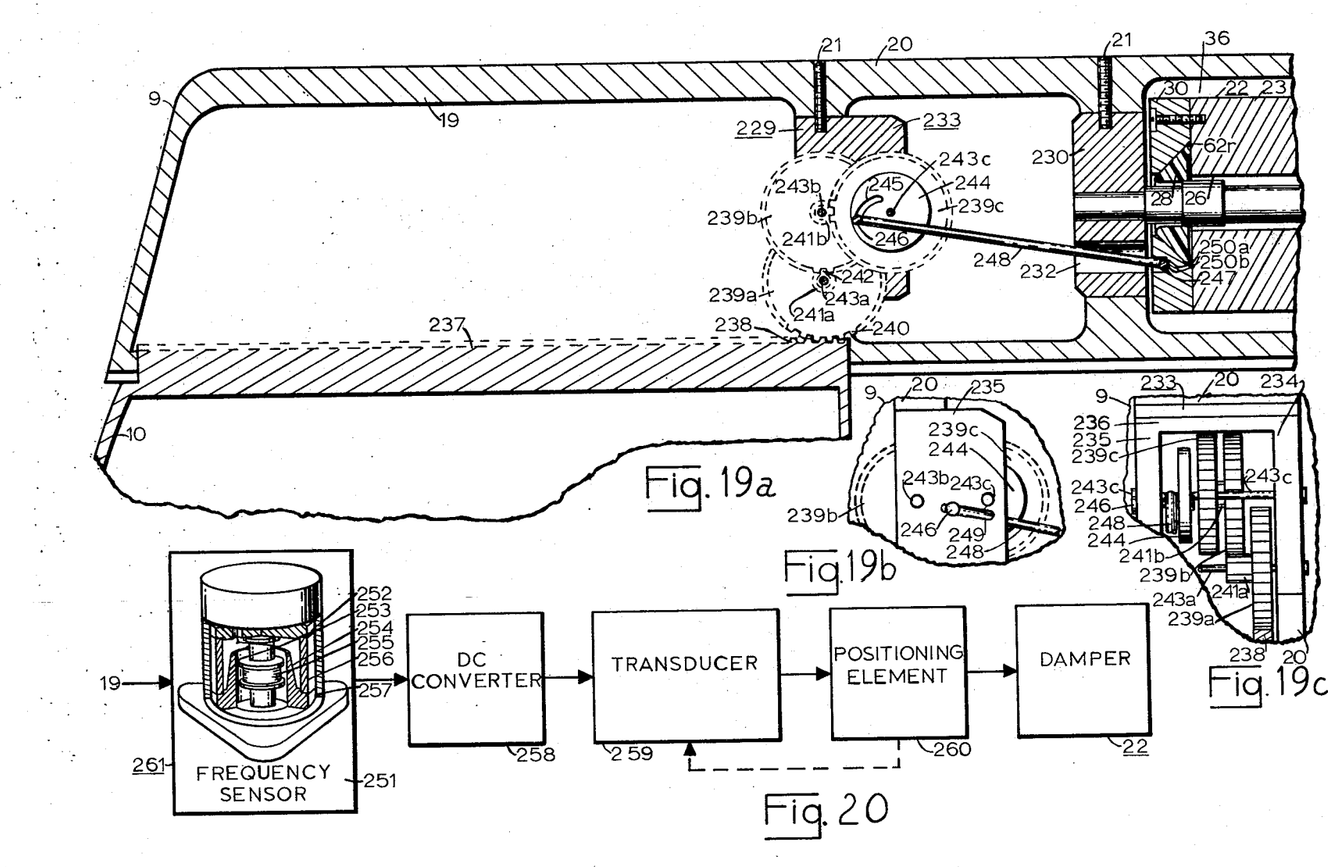

FIGS. 19a, 19b and 19c show several partial and a sectional view of an automatic adjustment mechanism for a machine tool-mounted damping unit. The damping unit that is automatically adjusted in this embodiment is damping unit 22 fully shown in FIG. 1 and previously described. The only differences are the deletion of adjusting screw 32, the modification of rear securing means 30 by the addition of recess 250a and hole 250b to allow insertion of one end of positioning element 248 and the securing thereof by pin 247, as well as use of modified rear plate 230 having additional aperture 232 to allow for the passage of positioning element 248. Machine column 10 has machined or secured to its top surface a transmitting means or rack 237 having teeth 238. Overarm 9 having overarm housing 19 has secured between a web 20 generally U-shaped bracket 233 (best seen in FIG. 19c) having connecting portion 236 and side portions 234, 235. Journalled between side portions 234, 235 are three similar shafts 243a, b, c carrying transmitting means or pinions 239a, b, c having teeth 240, with pinions 239a, b also including smaller integral pinions 241a, b having teeth 242. Shaft 243c also carries a variable transmission means or predetermined surface cam 244 having an arcuate cam slot 245. Freely movable within cam slot 245 is one end of pin 246, the other end of which is freely movable within slot 249 in side portion 235. Attached to pin 246 between cam 244 and side portion 235 is one end of a transferring means or positioning element 248, the other end of which is attached to a rear securing means 30 of damping unit 22 as previously described. In operation, the movement or setting of overarm 9 in relation to machine column 10 causes movement of pinion 239a in relation to rack 238, said movement being transferred by pinion 241a to pinion 239b which by means of pinion 241b transfers this movement to pinion 239c. Cam 244 mounted on shaft 243c is then caused to rotate which produces movement of pin 246 connected to positioning element 248 which then in turn causes movement of damper mass 23 and viscoelastic absorber elements 27, 28 in relation to support control locations 25, 26 thereby changing the amount of supported viscoelastic absorber materials between support control shaft 24 and damper mass 23. This automatic adjustment mechanism is thus of the position-responsive type and will automatically, depending on rack and pinion ratios and the proper cam slot profile as well as the setting of overarm 9 in relation to machine column 10, move the damping unit so that it is always in tune with the overarm 9 of milling machine 10. The cam slot profile 245 is a function of machine dynamics and damper viscoelastic absorber element stiffness variation characteristics, with the machine dynamics being obtained in tests while the absorber element characteristics are known, thus the damping unit and automatic adjustment mechanism can be properly designed. The ratios between large pinions 239a, b, c and small pinions 241a, b in this embodiment are 5 to 1 each, while the ratio between rack 237 and pinion 239a is 1:1 thereby giving an overall 25:1 ratio. The contour and length of cam slot 245 can then be constructed to provide the desired range of movement, with cam 244 being readily removable from shaft 243b if slot modifications are deemed necessary. Of course, an automatic adjustment mechanism of the type described may be utilized in any machine tool having at least one component subject to vibration and the showing of this mechanism in the environment of a milling machine is for illustrative purposes only.

FIG. 20 is a block diagram of another automatic adjustment mechanism 261 for a machine tool mounted damping unit composed of frequency sensor 251; D.C. converter 258; transducer 259; and positioning element 260. Frequency sensor 251 composed of inner pole pieces 252; springs 253; outer pole piece 254; coil and seismic mass 255; magnet 256; and case 257 is attached to a machine tool component subject to vibration, such as overarm housing 19. Sensor 251 measures the frequency of the machine tool component vibration during a machining operation and produces an electrical signal equal in frequency to the vibration or chatter frequency. D.C. converter 258 converts the frequency sensor signal into a D.C. signal proportional to the frequency of the vibration of the machine tool component which is then fed into transducer 259 which converts the D.C. signal into a force producing means. An example only, of D.C. converter 258, which could be utilized here, is Model HLFC-120 Log Frequency Converter manufactured by the Houston Instrument Corp. of Bellaire, Tex. Positioning element 260 then transfers said force to the machine tool damping unit, such as damping unit 22, with adjusting screw 32 deleted, as previously described, which will then be automatically positioned such that it is tuned to be effective for vibration control at this new frequency. Adjusting mechanism 261 is self-adjusting since, if the machine tool component frequency changes, thus indicating a different vibration frequency or mode of chatter, the damping unit will be automatically positioned such that it will be effective at this new frequency. Of course, adjusting mechanisms 229 and 261 may be used with slight modifications on any of the damping units described in this invention.

While the invention has been described in connection with possible forms or embodiments thereof, it is to be understood that the present disclosure is illustrative rather than restrictive and that changes or modifications may be resorted to without departing from the spirit of invention.

What is claimed is:

1. A machine tool damping unit for vibration control having at least one mode of vibration comprising:
    (a) at least one damper mass;
    (b) at least one means for supporting said damper mass and having at least one support control location;
    (c) at least one viscoelastic absorber element of variable cross section, having a predetermined range of working heights, journalling said damper mass; and
    (d) a means for vibration control adjustment to effect a movement between the absorber element and the support control location to vary the working height of the absorber element so as to vary the stiffness of the absorber element.

2. A machine tool damping unit for vibration control having at least one mode of vibration for use on a machine tool having at least one component subject to vibration comprising:
    (a) at least one damper mass;
    (b) at least one means for supporting said damper mass and having at least one support control location;
    (c) at least one viscoelastic absorber element of variable cross section, having a predetermined range of working heights, journalling said damper mass;
    (d) at least one means for retaining said absorber element; and
    (e) a means for vibration control adjustment to effect a movement between the absorber element and the support control location to vary the working height of the absorber element so as to vary the stiffness of the absorber element.

3. The machine tool damping unit of claim 2 wherein the viscoelastic absorbed element comprises a generally circular body having at least two interconnected axially spaced end surfaces of different concentric diameters, and having a central axial hole therethrough substantially perpendicular to the end surfaces.

4. The machine tool damping unit of claim 2 wherein the viscoelastic absorber element comprises a truncated generally cone-shaped body having a central axial hole therethrough.

5. The machine tool damping unit of claim 2 including:
    (a) a viscoelastic absorber element of generally truncated cone-shape with an axial hole therethrough having in its free state prior to installation:
        (1) an included cone angle of substantially 84°;
        (2) a tapered central axial hole having an included angle of substantially 7°; and
        (3) a large diameter cone end surface having a recessed annular portion for limited surface contact; and
    (b) an absorber element retaining means having an included angle of 90°, so that forcing the 84° free-state cone into the 90° retainer means provides for both equal pressure distribution on the cone surface and a central axial hole having substantially 0° taper.

6. The machine tool damping unit of claim 2 wherein the viscoelastic absorber element comprises a centrally apertured, truncated, generally cone-shaped body having:
    (a) an annular small end surface;
    (b) an annular large end surface having a recessed annular portion extending from the inside diameter of said large end surface to approximately the outside diameter thereof;
    (c) an outer surface extending as a taper from the outside diameter of said small end surface to the outside diameter of said large end surface; and
    (d) a cylindrical surface joining the inside diameters of said small end surface and the recessed annular portion of said large end surface.

7. The machine tool damping unit of claim 6 including a cylindrical surface, perpendicular to said annular large end surface, interposed between said outer surface and said annular large end surface.

8. The machine tool damping unit of claim 7 wherein the means for retaining said viscoelastic absorber element provides for a recess between said retaining means and the cylindrical surface perpendicular to said large end surface to allow for expansion of said viscoelastic absorber element, and to prevent high stress concentrations at the large end surface.

9. The machine tool damping unit of claim 2 wherein the viscoelastic absorber element comprises a generally ring shaped body having:
   (a) a cylindrical outer surface;
   (b) at least two axially spaced annular end surfaces on opposite ends of said outer surface; and
   (c) a tapered inner surface connecting the inside diameters of said end surfaces.

10. The machine tool damping unit of claim 2 wherein the viscoelastic absorber element comprises a generally annular body having:
   (a) an annular small end surface;
   (b) an annular large end surface having a recessed annular portion;
   (c) an outer surface substantially normal to and connected with the outside diameters of said end surfaces; and
   (d) a sloping inner surface connecting the inside diameters of said end surfaces.

11. The machine tool damping unit of claim 10 with the addition of a cylindrical surface, perpendicular to said annular large end surface, interposed between said inner surface and said annular large end surface.

12. The machine tool damping unit of claim 2 wherein the viscoelastic absorber element comprises a body of predetermined length substantially wedge-shaped in cross-section having:
   (a) two rectangular side surfaces perpendicularly intersecting on their first long edges;
   (b) a sloping rectangular side surface intersecting, with its long edges, the second long edges of said perpendicularly intersecting side surfaces; and
   (c) two substantially wedge-shaped end surfaces connecting the short edges of said rectangular side surfaces.

13. The machine tool damping unit of claim 12 wherein one of said perpendicularly intersecting rectangular side surfaces has a parallel recessed portion intersecting the first long edge of said other rectangular side surface.

14. The machine tool damping unit of claim 13 with the addition of a rectangular side surface, normal to one of said perpendicularly intersecting side surfaces; interposed between at least one of said second long edges of said perpendicularly intersecting side surfaces and said sloping rectangular side surface.

15. The machine tool damping unit of claim 2 wherein the viscoelastic absorber element comprises a generally elongated body substantially wedge-shaped in cross-section, having:
   (a) two substantially identical parallel end surfaces comparable to said cross-section having:
      (1) perpendicularly intersecting large sides, with one of said sides having a recessed portion joined by a connecting portion;
      (2) small sides perpendicularly intersecting the ends of the large sides remote from the intersection of said large sides; and
      (3) a sloping side connecting the ends of the small sides remote from their intersections with the large sides; and
   (b) a plurality of perpendicular parallelograms joining said end surfaces.

16. The machine tool clamping unit of claim 2 wherein the predetermined range of working heights of said viscoelastic absorber element will allow a stiffness variation of about 10:1.

17. The machine tool damping unit of claim 2 including the use of at least two viscoelastic absorber elements of comparable variable cross-sections.

18. The machine tool damping unit of claim 17 wherein one of said absorber elements has a different material composition.

19. The machine tool damping unit of claim 17 including at least two support control locations with at least one support control location in its position in relation to the absorber element being different from the positions of the remaining control locations in relation to the remaining absorber elements so as to effect a different working height in at least one absorber element.

20. The machine tool damping unit of claim 17 wherein movement may be effected between the damper mass and the damper mass support means without changing the final positions of the support control locations in relation to the absorber elements.

21. The machine tool damping unit of claim 2 including at least one viscoelastic absorber element of variable cross-section, having a predetermined range of working heights, interposed between said damper mass and said damper mass support means.

22. The machine tool damping unit of claim 2 wherein the damper mass includes at least one hole perpendicular to the supporting means, confining at least one elastic member in abutting relation with the supporting means in a direction so as to generally balance the weight of the damper mass, thereby reducing the static shear loads on the viscoelastic absorber elements.

23. An automatic adjustment mechanism for a damping unit used according to claim 2 on a machine tool having at least one component, subject to vibration, comprising means responsive to relative movement between the machine tool and the machine tool component for adjusting the damping unit so as to effectively dampen the vibrations of the machine tool component in its various positions, said adjusting means including a variable ratio transmission device for modifying the movement of the damping unit in response to the relative movement between the machine tool and the machine tool component in accordance with a predetermined program.

24. A position-responsive automatic adjustment mechanism for a damping unit used according to claim 2 on a machine tool having at least one component subject to vibration comprising:
   (a) a rack and pinion arrangement for transmitting movement, carried in part on the machine tool and in part on the machine tool component, such that relative motion therebetween produces movement;
   (b) a predetermined-surface cam, the motion of which is engendered by said rack and pinion arrangement, and
   (c) a positioning element for transferring said cam motion to the machine tool damping unit, so that the damping unit is always in tune with the machine tool component subject to vibration regardless of its relative position.

25. A frequency-responsive automatic adjustment mechanism for a damping unit used according to claim 2 on a machine tool having at least one component subject to vibration comprising:
   (a) a frequency sensor attached to the machine tool component which measures the machine tool component frequency and converts it into an electrical signal equal in frequency to the vibration frequency;
   (b) a D.C. current frequency converter which converts the frequency sensor signal into a D.C. signal proportional to the vibration frequency of the machine tool component;
   (c) a transducer for converting the D.C. signal into a force producing means; and
   (d) a positioning element for transferring said force to the machine tool damping unit, so that the damping unit is self-adjusting since when the machine tool component frequency changes the damper will be automatically positioned such that it is tuned to be effective for vibration control at this new frequency.

References Cited

UNITED STATES PATENTS 2,838,137  6/1958  Wallerstein.
2,896,447  7/1959  Phillips et al.
3,242,791  3/1966  Smith.

DUANE A. REGER, Primary Examiner

U.S. Cl. X.R.

188—103